H. T. BLACKWELL.
TOOL-CARRYING TRUCK FOR USE IN BORING OIL-WELLS.
No. 194,325. Patented Aug. 21, 1877.
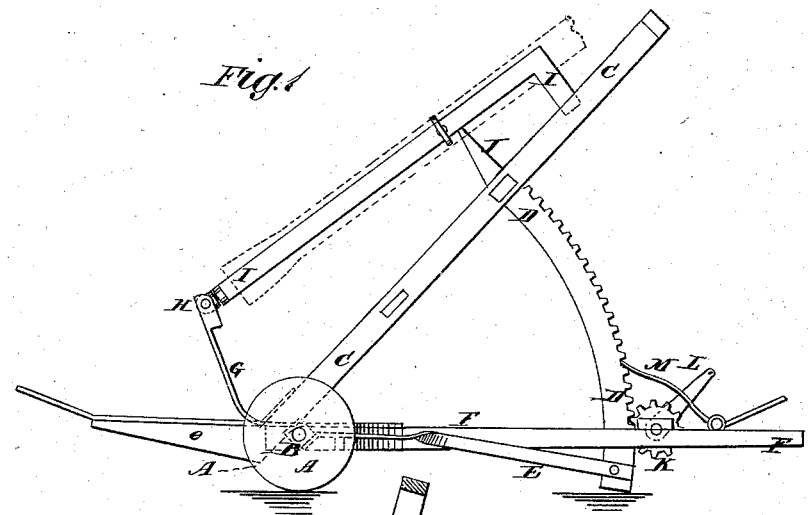
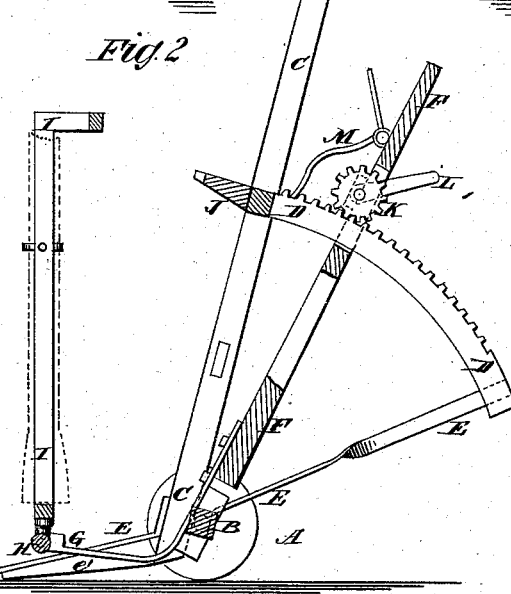
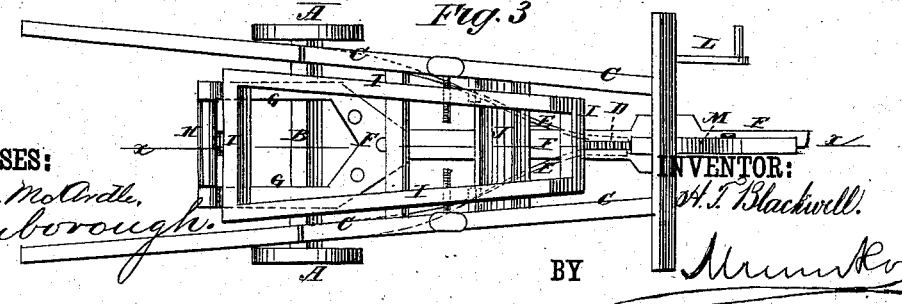
WITNESSES:
INVENTOR:
H. T. Blackwell.
BY
ATTORNEYS.

UNITED STATES PATENT OFFICE.

HENRY T. BLACKWELL, OF EDENBERG, (KNOX P. O.,) PENNSYLVANIA.

IMPROVEMENT IN TOOL-CARRYING TRUCKS FOR USE IN BORING OIL-WELLS.

Specification forming part of Letters Patent No. 194,325, dated August 21, 1877; application filed July 23, 1877.

*To all whom it may concern:*

Be it known that I, HENRY THOMAS BLACKWELL, of Edenberg, (Knox P. O.,) in the county of Clarion and State of Pennsylvania, have invented a new and useful Improvement in Tool-Carrier, of which the following is a specification:

Figure 1 is a side view of my improved machine. Fig. 2 is a vertical section of the same taken through the line $x\ x$, Fig. 3. Fig. 3 is a top view of the same.

Similar letters of reference indicate corresponding parts.

The object of this invention is to furnish an improved machine for carrying the bits for boring oil-wells from the tempering-tub to the auger, and holding them while being screwed into the auger-stem, which shall be simple in construction and convenient in use.

The invention consists in the combination of the wheels and axle, the main frame, the curved rack-bar, the brace-bar, the pivoted bar, the spring-bars, the round, the swiveled frame, and the gear-wheel, crank, and pawl, with each other, as hereinafter fully described.

A are two small wheels, which revolve upon the journals of the axle B. To the axle B is attached the lower end of a frame, C, to a cross-bar of which is attached the upper end of the rack-bar D. The rack-bar D is curved upon the arc of a circle, having its center in the axis of the axle B.

To the lower end of the rack-bar D are attached the outer ends of two bars E, the forward parts of which are attached to the axle B. The frame C, the rack-bar D, and the bars E thus form a rigid frame-work. The forward ends of the bars E project in front of the axle B, and are strengthened by wooden bars $e'$ attached to their lower sides.

F is a bar, the forward end of which is forked, and has bearings attached to it, which work upon journals formed upon the axle B. To the forward end of the bar F are attached two spring-bars, G, which are bent upward, and to the forward ends of which are pivoted the ends of a round, H. To the center of the round H is swiveled the center of the lower cross-bar of the frame I, the upper ends of the side bars of which are bent to the rearward, and are connected by a cross-bar. The frame I is designed to receive the bit, the cutting end of which rests upon the lower cross-bar of the said frame I, and which is secured in place by two hand-screws passing through the side bars of the said frame I. The side bars of the frame I rest against the edge of a plate, shelf, or frame, J, attached to the frame C, the middle part of said edge being cut away to give space for the bit.

In the rear part of the bar F is formed a hole to receive the rack-bar D.

K is a gear-wheel, the teeth of which mesh into the teeth of the rack-bar D, and its journals revolve in bearings attached to the bar F. One of the journals of the gear-wheel K projects, and to it is attached the crank L, by means of which the said gear-wheel is turned.

To the outer part of the bar F is pivoted a lever-pawl, M, the engaging end of which engages with the teeth of the rack-bar D to hold the bar F in any position into which it may be adjusted. By this arrangement the frame I and the bit secured in it may be adjusted as may be required.

The spring-bars G should have strength enough to hold the bit to its place while screwing it into the auger-stem without its being necessary to move the gear-wheel K.

This machine enables one man, with great ease, to do the work that has heretofore been very laborious for two.

Having thus described my invention, I claim as new and desire to secure by Letters Patent—

The combination of the wheels and axle A B, the frame C, the curved rack-bar D, the brace-bars E, the pivoted bar F, the spring-bars G, the round H, the swiveled frame I, and the gear-wheel, crank, and pawl K L M with each other, substantially as herein shown and described.

HENRY THOMAS BLACKWELL.

Witnesses:
 EDWIN ROWE,
 JOHN MOON.